United States Patent
Scharff

[19]

[11] Patent Number: 5,821,735
[45] Date of Patent: Oct. 13, 1998

[54] ACCUMULATOR CHARGING CIRCUIT

[75] Inventor: Christian Scharff, Essen, Germany

[73] Assignee: Nokia Mobile Phones Ltd., Espoo, Finland

[21] Appl. No.: 810,824

[22] Filed: Mar. 6, 1997

[30]  Foreign Application Priority Data

Mar. 8, 1996 [DE] Germany .................. 196 09 140.3

[51] Int. Cl.[6] ................................................ H01M 10/46
[52] U.S. Cl. ............................................................ 320/125
[58] Field of Search .................................. 320/125, 129, 320/136, 139, 140, 141, 145, DIG. 22, 108, 128, 138, 148, 150

[56]   References Cited

U.S. PATENT DOCUMENTS 4,162,439  7/1979  Schneider .
4,965,506  10/1990 Algra et al. .
5,365,161  11/1994 Inoue et al. .
5,446,364  8/1995  Naskali ...................................... 320/2

FOREIGN PATENT DOCUMENTS

2809514 A1  9/1978  Germany .
228122 A1   10/1985 Germany .

*Primary Examiner*—Edward Tso
*Attorney, Agent, or Firm*—Perman & Green, LLP

[57]  ABSTRACT

A charging circuit for charging accumulators, in the case of which current measurement is carried out in the line to the accumulator in order to monitor the charging process. In order that it unnecessary to carry out any internal voltage doubling to produce a reference voltage, a small constant current is taken from the output current in order to produce the reference voltage. At the start of the charging process or in order to reproduce a normal, controlled charging after a short-circuit, a circuit element is present which ensures that a small constant current always flows to produce the reference voltage.

6 Claims, 5 Drawing Sheets

ACCUMULATOR CHARGING CIRCUIT

FIELD OF THE INVENTION

The present invention relates generally to a charging circuit for charging accumulators and, in particular, relates to such a charging circuit which carries out a current measurement in the line towards the accumulator in order to monitor the charging process.

BACKGROUND OF THE INVENTION

Using such a circuit, an accumulator is charged via a current measuring circuit which produces a measured voltage which is dependent on the charging current. This measured voltage is passed to a voltage comparator which compares it with a reference voltage and drives a switching element as a function of the comparison result, which switching element in turn switches the charging current for charging the accumulator on and off. Such a limitation on the current measurement in the forward line is specified for specific reasons in many chargers. However, a problem arises in the production of the measured voltage, which is dependent on the charging current, in the forward line in that the voltage level of the measured voltage is dependent on the voltage applied to the accumulator.

According to the prior art in accordance with FIGS. 1 and 2, the measured voltage, which is dependent on the charging current, is produced by three parallel-connected resistors 35 in the circuit block G. The reference voltage which is required for voltage comparison is produced in the circuit block B by two resistors 3 and 5 and a zener diode 2. A voltage which drives a current through the resistors 3 and 5 is supplied by the zener diode 2. This current causes a voltage drop on the resistor 5, which voltage drop is used as the reference voltage. In order that the zener diode 2 can supply the voltage, it is itself supplied via a resistor 4 with a voltage VB which must be somewhat larger than the output voltage of the charging voltage itself. Since the supply voltage Vcc of the charging circuit is intended to be between 10.8 volts and 20 volts and its output voltage between 0 volt and 10.8 volts, the supply voltage Vcc is doubled in a circuit block H for producing the voltage VB, in order to ensure a voltage VB which is greater than the output voltage of the charging circuit. The charging circuit requires a clock signal as well as the circuit block H, which is of complex construction, for such voltage doubling.

SUMMARY OF THE INVENTION

It is therefore the object of the present invention to provide a charging circuit which manages without voltage doubling and nevertheless measures the current in the path towards the accumulator, for charge monitoring.

A solution to the object which has been set is specified in claim 1. Advantageous developments can be found in the subclaims.

A charging circuit according to the invention for charging an accumulator via a current measuring circuit which produces a measured voltage which depends on the charging current and is supplied to a voltage comparator which compares the measured voltage, which is produced by the current measuring circuit, with a reference voltage and drives a switching element as a function of the comparison result, which switching element switches the charging current for charging the accumulator on and off is characterized in that the charging circuit draws from its output path a reference current for producing the reference voltage using a current/voltage converter.

This solution, namely to draw a reference current from the output path of the charging circuit itself in order to produce the reference voltage, leads to the result that there is no longer any need to have available in order to produce the reference voltage any voltage which is greater than the output voltage of the charging circuit itself and that, therefore, voltage doubling is no longer required. The circuit block H which is required in the prior art and is of complex construction for voltage doubling in a charging circuit can thus be omitted according to the invention. This leads to a circuit which manages with a very small number of components.

An advantageous development of the charging circuit according to the invention is characterized by a current sink which adjusts the reference current to a specific current level.

By means of such a current sink, a constant current for producing the reference voltage is drawn from the output path of the charging circuit. This ensures that the reference voltage, and thus the charging current for charging the accumulator as well, remain constant.

A further advantageous refinement of the invention is characterized in that the reference current is variable by means of the current sink.

The advantage of a variable reference current lies in the change in the reference voltage linked to it, which results in a change in the charging current for charging the accumulator. The charging current can thus be matched to different accumulators using relatively simple means.

Another advantageous refinement of the present invention is characterized in that the current measuring circuit has an impedance element or parallel-connected impedance elements, across which the measured voltage is in each case dropped.

The advantage of using commercially available high-precision (1%) impedance elements is that accurate conversion of the charging current into a measured voltage, which is dropped across the impedance elements, is ensured using economical means.

A still further advantageous refinement of the invention is characterized in that the reference voltage which is produced by the current sink is measured upstream of the impedance elements and the measured voltage is measured downstream from them.

The advantage of this refinement is that, on the one hand, measurement errors no longer occur and that, on the other hand, the potential at the positive input of the differential amplifier is now lower than if the arrangement were designed differently. In consequence, it is possible for the minimal supply voltage of the differential amplifier to be able to correspond with the maximum output voltage of the charging circuit, that is to say does not need to be raised to above the maximum output voltage in order to supply the differential amplifier.

A next advantageous refinement of the charging circuit according to the invention is characterized by a starting circuit which continuously supplies a small current to the output path of the charging circuit.

This refinement is particularly helpful since, without the starting circuit, return from the short-circuit state to the operating state would no longer be possible. This is due to the fact that, without any charging current in the circuit according to the invention to the output path, no reference current can be drawn, for producing a reference voltage. In consequence, the measured voltage is also no longer produced, so that, thus, no new comparison can take place and the switching element cannot be driven once again.

Finally, one advantageous refinement of the charging circuit according to the invention comprises the starting circuit being connected to the output path between the switching element and the current measuring circuit.

This arrangement option results in a particularly simple configuration of the starting circuit which needs to maintain only a small limited current flow through the output path so that, after a short circuit (and possibly also when starting a charging process after connection of an accumulator), the charging process is initiated again.

BRIEF DESCRIPTION OF THE DRAWINGS

Further features and characterizing factors of the present invention are illustrated by the exemplary embodiment, which is described in the following text, in conjunction with the attached figures, in which.

DETAILED DESCRIPTION OF THE INVENTION

Figure 1:
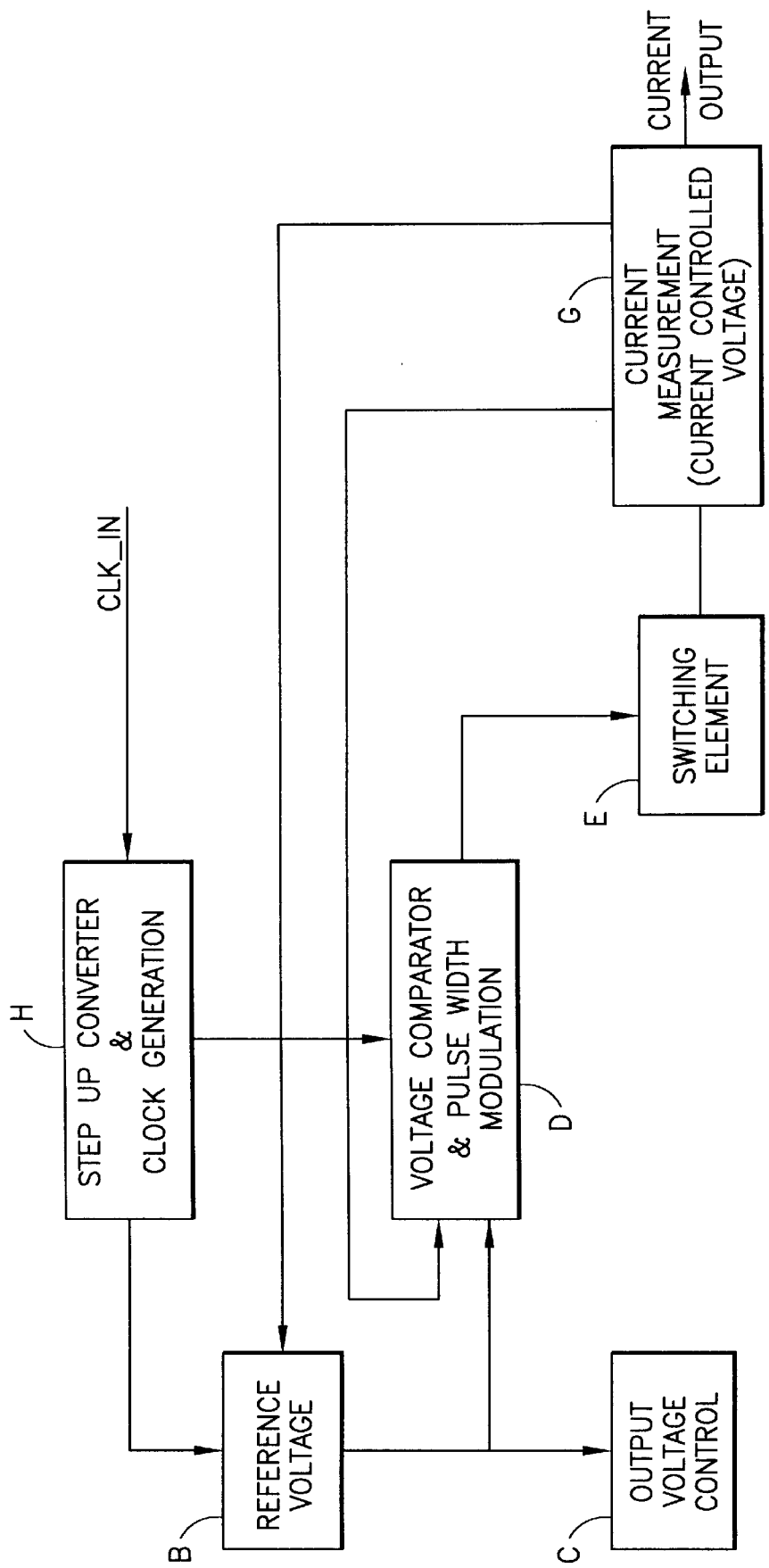
FIG. 1 shows a block diagram of a charging circuit according to the prior art.

In the block diagrams and circuit diagrams, circuit blocks having the same or similar functions are provided with the same reference characters.

FIG. 1 shows a block diagram of a charging circuit according to the prior art. In this case, the supply voltage is doubled in a circuit block H with the aid of a clock signal CLK_IN which has to be applied to it. This doubled supply voltage is used in the circuit block B to produce a reference voltage as well as for supplying the voltage comparator. Furthermore, a clock signal is tapped off in the circuit block H and is supplied to the circuit block D in which a voltage comparator and a stage for pulse-width modulation are located. The current which is produced by the charging circuit for charging the accumulator is prepared in the circuit block G for measurement in that a voltage which is dependent on the charging current is produced there. This voltage is supplied to the circuit block D, at the voltage comparator. There is a connection from the circuit block G to the circuit block B, in which the reference voltage is produced, in order that this reference voltage can be raised to the level of the output voltage. The reference voltage is passed to an output voltage limiter in the circuit block C and to the voltage comparator in the circuit block D. The voltage comparator compares the reference voltage with the measured voltage and reduces the pulse width of the switching element in the circuit block E if the measured voltage is greater than the reference voltage, and increases the pulse width if the measured voltage is less than the reference voltage. The charging current is in each case switched on and off in the circuit block E by this switching element.

Figure 2:
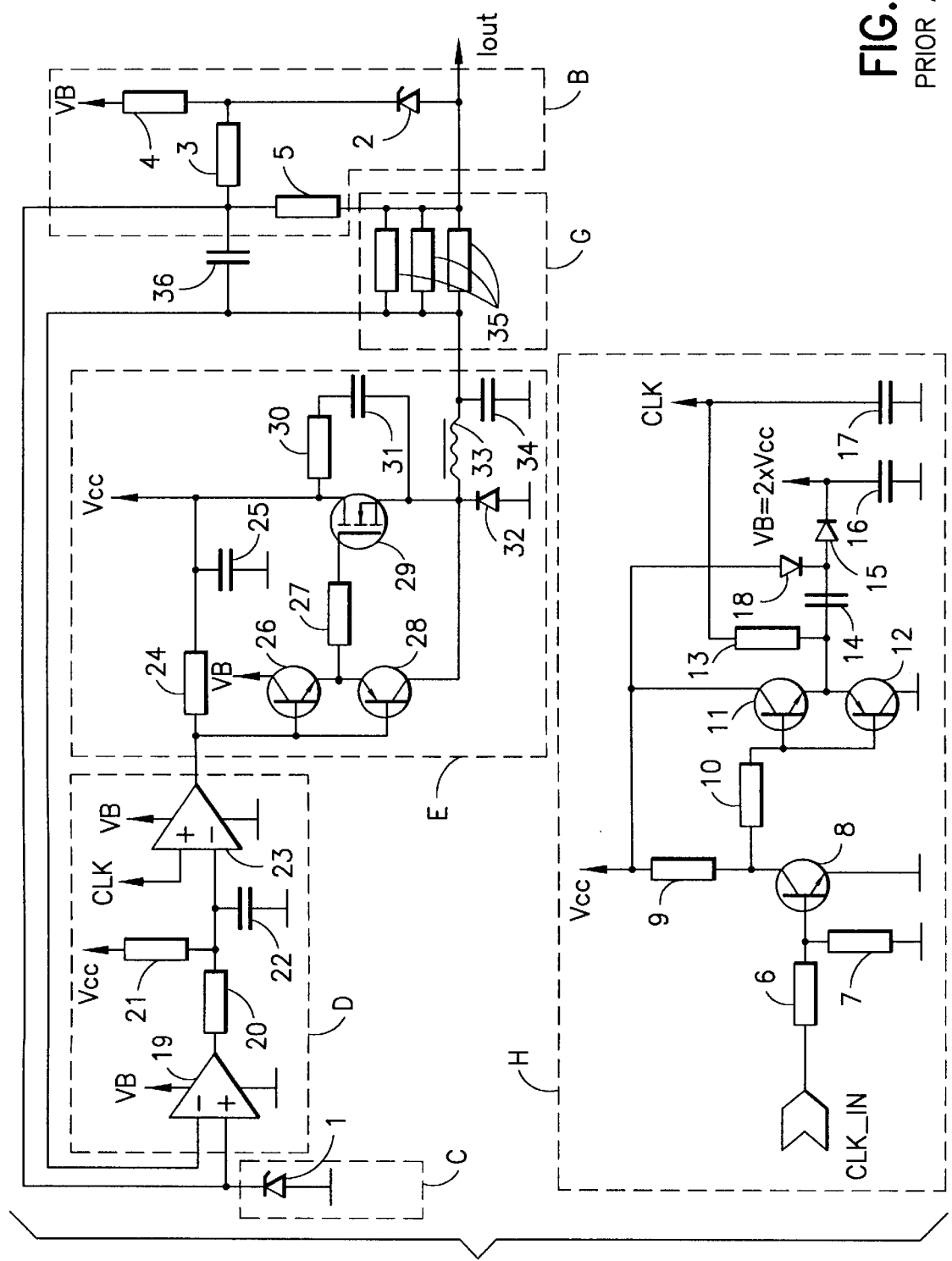
FIG. 2 shows a circuit diagram of the charging circuit according to the prior art.

FIG. 2 shows the circuit diagram associated with FIG. 1. Once again the circuit blocks which are present in FIG. 1 are shown and are provided with the same reference characters.

Figure 3:
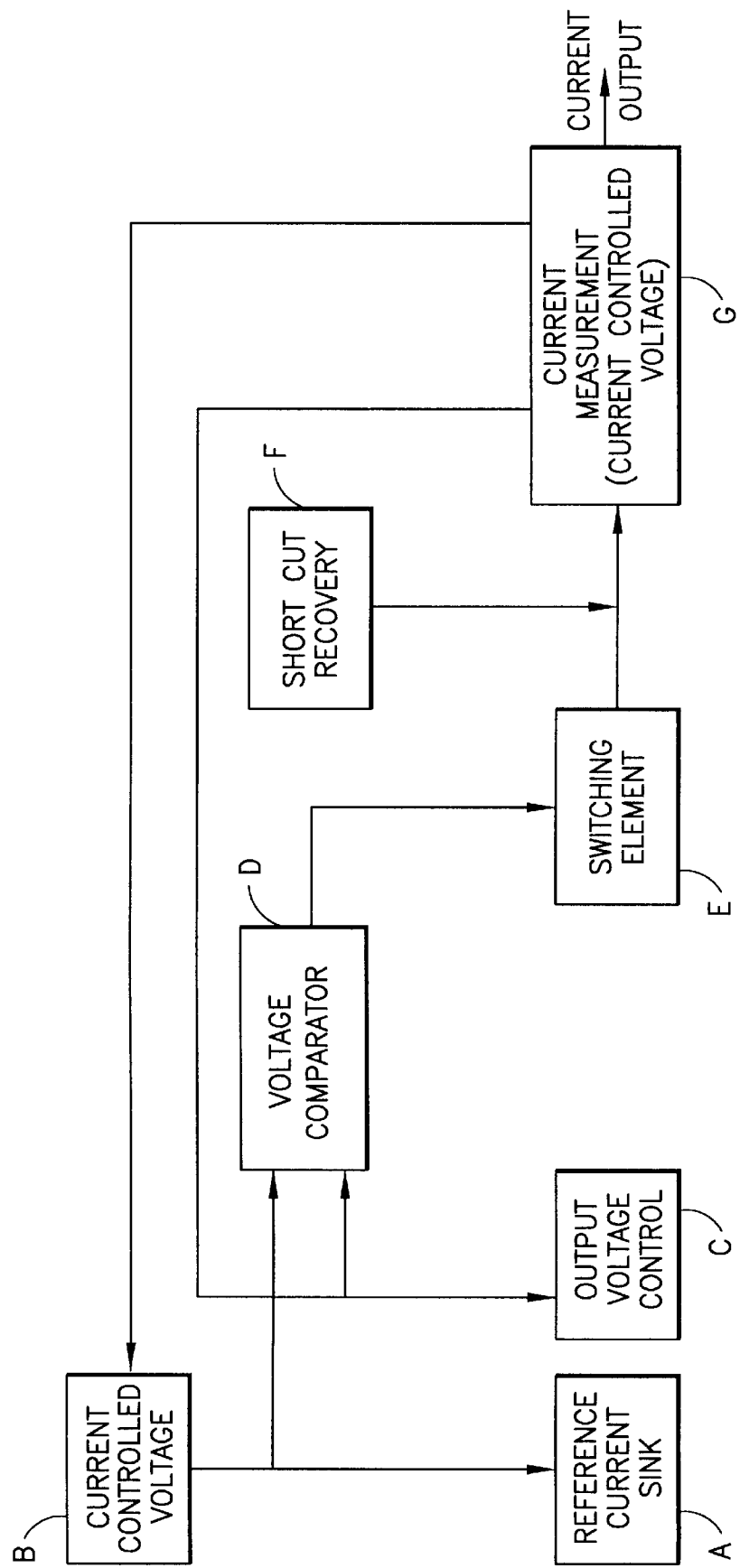
FIG. 3 shows a block diagram of a charging circuit according to the invention.

FIG. 3 shows a block diagram of a charging circuit according to the invention. Circuit blocks which have the same or similar function as the circuit blocks in a charging circuit according to the prior art are provided with the same reference characters. Once again, the charging current is switched on and off by a switching element in the circuit block E. This charging current is prepared for measurement as in the prior art in that a measured voltage, which is dependent on the charging current, is produced in the circuit block G. This measured voltage, which is dependent on the charging current, is supplied to a voltage comparator in the circuit block D and to an output voltage limiter in the circuit block C. A small current is tapped off from the output current by means of a reference current sink in the circuit block A, by means of which small current a reference voltage, which is dependent on this current, is produced in the circuit block B. This reference voltage is also supplied to the voltage comparator in the voltage block D. If the measured voltage is greater than the reference voltage, the voltage comparator controls the switching element in the circuit block E such that it switches off the charging current, and if the measured voltage is less than the reference voltage, such that it switches the charging current on. In order that, after a short circuit, the circuit is brought back to the normal operating state from the state in which the charging current is switched off, in which normal operating state a decision is continuously made as to whether the charging current should be switched on or off, a circuit block F is connected to the path between the switching element in the circuit block E and the accumulator.

Figure 4:
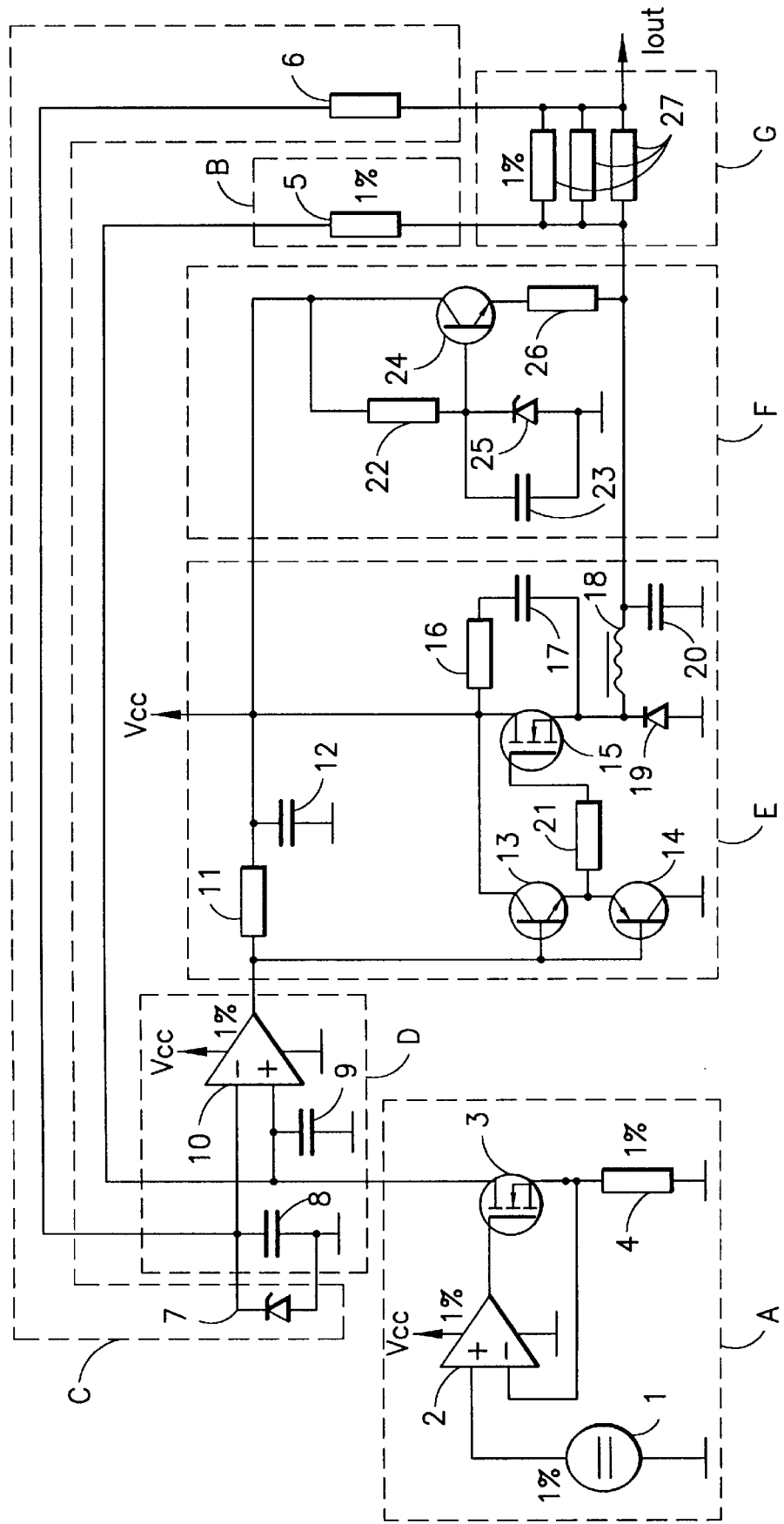
FIG. 4 shows a circuit diagram of the charging circuit according to the invention.

FIG. 4 shows the circuit diagram, associated with FIG. 3, of a charging circuit according to the invention. Once again, the circuit blocks are shown and are provided with the same reference symbols as in the block diagram in FIG. 3. The reference current sink in the circuit block A is formed by means of a differential amplifier 2, to whose positive input a precise constant voltage is applied which can be produced using a commercially available component 1, of precision class 1%. The second connection of the constant voltage component 1 is connected to earth. The negative input of the differential amplifier 2 is connected to the source connection of an N-FET 3, whose gate connection is connected to the output of the differential amplifier 2. The source connection of the N-FET 3 is furthermore connected to earth via a resistor 4, which may also be composed of a series circuit formed by a plurality of resistors. The drain connection of N-FET 3 is connected via a resistor 5 in the circuit block B to the output path, which is located between the circuit block E and the accumulator, of the charging circuit, upstream of the measuring resistors 27 of the circuit block G. The positive input of a differential amplifier 10 in the circuit block D is connected to the input of the resistor 5, to which the drain connection of the N-FET 3 is also connected. The positive input of the differential amplifier 10 is furthermore connected to earth via a capacitor 9. The negative input of the differential amplifier 10 is connected via resistor 6 to the output of the charging circuit, downstream from the measuring resistors 27 of the circuit block G. This negative input is furthermore connected to earth via a capacitor 8. In parallel with this capacitor 8, the cathode of a zener diode 7 is connected to earth and its anode is connected to the negative input of the differential amplifier 10, and via the resistor 6 to the output of the charging circuit. The output of the differential amplifier 10 is connected to the respective base of an NPN transistor 13 and of a PNP transistor 14. These two transistors form a push/pull stage for driving a P-FET 15 which switches the charging current for charging the accumulator on and off. To this end, the emitter of the NPN transistor 13 is connected to the emitter of the PNP transistor 14, and these two emitters are jointly connected, via a resistor 21, to the gate connection of the P-FET 15. The collector connection of the NPN transistor 13 is connected to the supply voltage Vcc, and the collector of the PNP transistor 14 is connected to earth. The two interconnected base connections of the transistors 13 and 14 are furthermore connected via a resistor 11 to the supply voltage Vcc. A capacitor 12 is connected between the supply voltage Vcc and earth. The drain connection of the P-FET 15 is connected to the supply voltage Vcc, and its source connection is connected to earth via a diode 19, the anode of the diode 19 being connected to earth and the cathode being connected to the source connection of the P-FET 15. Located between the drain connection and the source connection of the P-FET 15 is a series circuit formed by a resistor 16 and a capacitor 17, the resistor being connected to the drain connection and the capacitor being connected to the source connection. A coil 18 for smoothing the output current is located in the output path of the charging circuit, between the source connection of the P-FET 15 and the measuring resistors 27 in the circuit block G, which are arranged in the output path directly upstream of the accumulator. The circuit block G may comprise a resistor 27 connected in the output path or a parallel circuit formed by a plurality of resistors 27 connected in the output path. Downstream from the coil 18, the output path of the charging circuit is connected to earth via a capacitor 20. Furthermore, the emitter of an NPN transistor 24 is connected via a resistor 26 to the output path of the charging circuit, upstream of the measuring resistors 27 of the circuit block G and downstream of the coil 18. The collector of the NPN transistor 24 is connected to the supply voltage. A resistor 22 is located between the collector of the NPN transistor 24 and its base. A zener diode 25 is connected between the base and earth, its cathode being connected to earth and its anode to the base of the NPN transistor 24. A capacitor 23 is connected in parallel with this zener diode 25.

Figure 5:
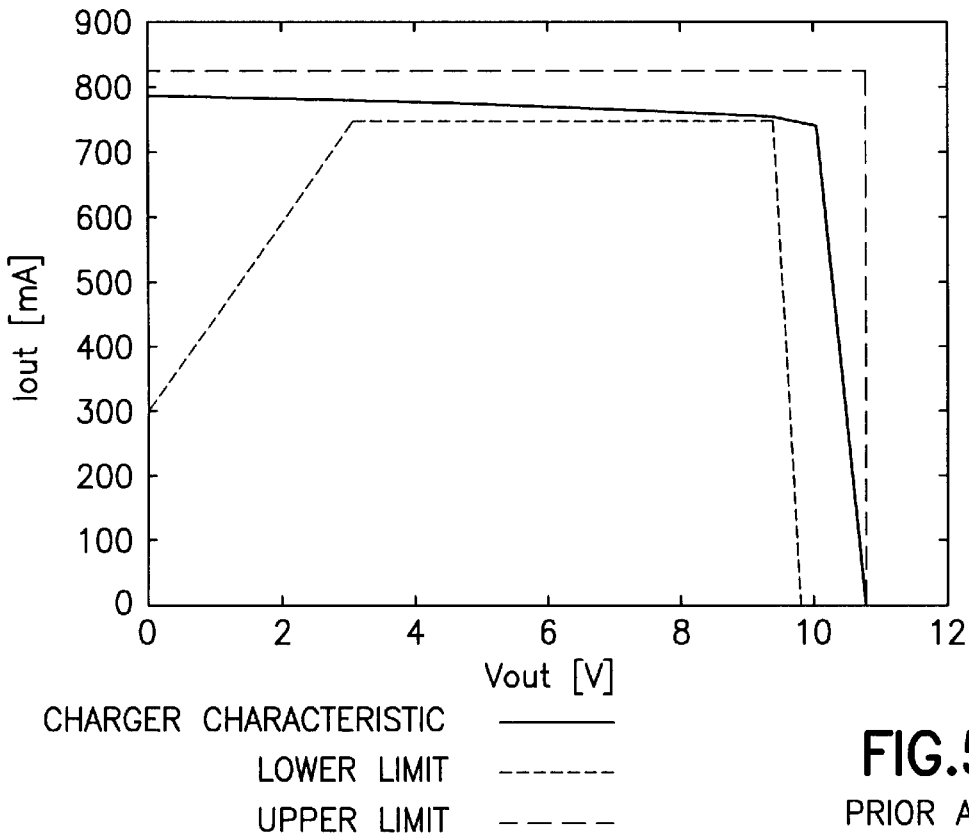
FIG. 5 shows the characteristic of the output current as a function of the output voltage for the charging circuit according to the prior art.
Figure 6:
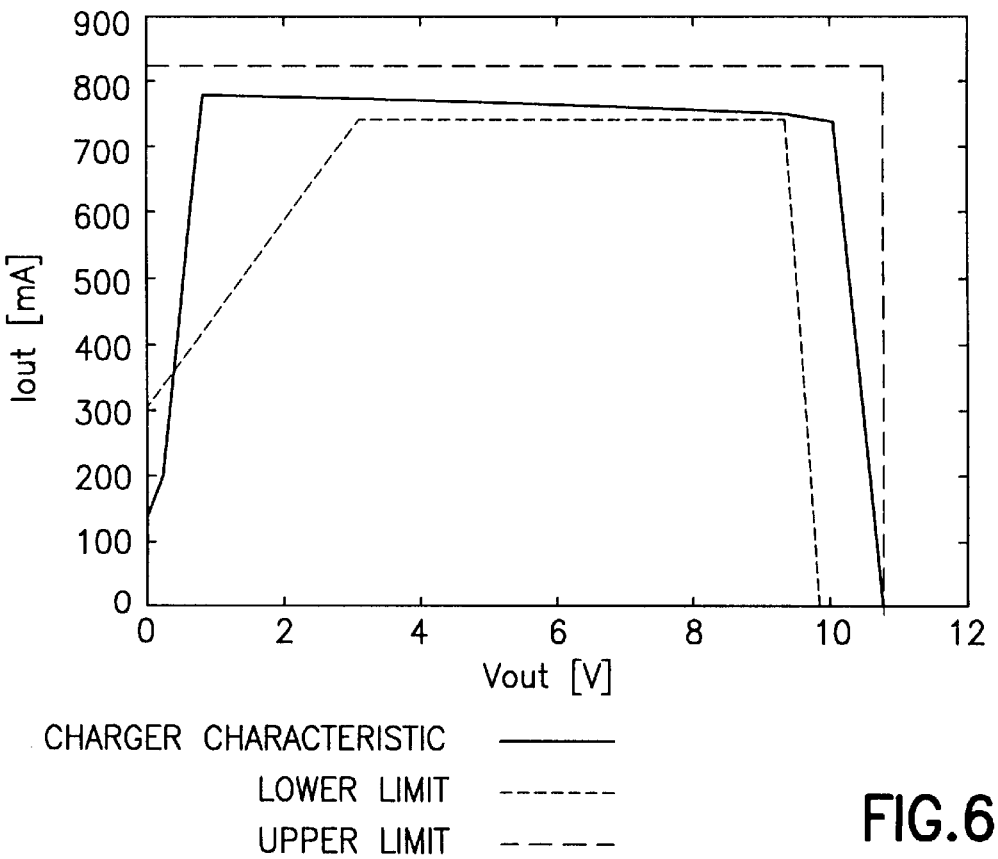
FIG. 6 shows the characteristic of the output current as a function of the output voltage for the charging circuit according to the invention.

This circuit operates as follows. The reference current sink in the block A draws a small current from the output path of the charging circuit upstream of the current measuring resistors 27. As a result of this current, a voltage is dropped on the resistor 5 of the circuit block B. This voltage is the reference voltage. As a result of the current Iout which flows out of the charging circuit and must flow through the measuring resistors 27, a measured voltage is dropped on these measuring resistors 27. These two voltages (the reference voltage and the measured voltage) are applied to the inputs of the differential amplifier 10. If the reference voltage is less than the measured voltage, then the differential amplifier 10 switches the P-FET 15 off via the push/pull stage comprising the transistors 13 and 14, and this interrupts the flow of charging current. If, in contrast, the reference voltage is greater than the measured voltage, then the P-FET 15 is switched on again by the differential amplifier 10 via the push/pull stage comprising the transistors 13 and 14, and a current flow from the charging circuit is thus produced. A DC voltage having a residual ripple of less than 100 mV peak to peak is produced from the rectangular current waveform subject to a fast switching sequence (between 20 kHz and 700 kHz) and subject to the elements 18 to 20. The frequency of the switching sequence can be adjusted by means of the capacitors 8 and 9 which are in each case connected between one of the inputs of the differential amplifier 10 and earth. The resistor 16 and the capacitor 17 are connected between the drain connection and the source connection of the P-FET 15 in order that its switching behaviour is improved and it is in consequence heated to a lesser extent. An additional voltage is applied to the output path of the charging circuit by means of the elements 22 to 26. As a result of this additional voltage, the output potential is raised, for example after the end of a short circuit, to such an extent that the reference current for producing the reference voltage can flow again and, in consequence, the current limiter circuit is once again made able to control the output current. FIGS. 5 and 6 show the characteristics of the output current as a function of the output voltage of the charging circuit according to the prior art and of the charging circuit according to the invention. It can clearly be seen that the two circuits have the same output characteristics in the relevant region of an output voltage of more than 1.0 volt. The difference in the region below 1.0 volt is a result of the fact that, in the case of the charging circuit according to the invention, the output current cannot be controlled correctly here since only a current which is produced by the circuit block F flows in this region and the P-FET 15 in the circuit block E remains switched off. This behaviour comes about since there is no dedicated current supply for producing the reference voltage, and the reference current is taken from the output path of the charging circuit itself. However, there also does not need to be any circuit for voltage doubling in the charging circuit according to the invention, for this purpose.

The charging circuit constructed according to the invention is used for fast charging of Ni-Cd accumulators in mobile telephones. It satisfies the following conditions:

Supply voltage of the charger 10.8 V to 20 V
Output voltage: 0 V to 10.8 V max.
Constant output current up to 1 A [5% tolerance allowed]
Residual ripple <100 mV peak to peak
Current measurement in the forward line
Simple construction
Good reliability
Components heated to only a small extent in operation Such a charging circuit can, of course, be used not only for charging accumulators in mobile telephones but can actually be used in any other equipment which operates with accumulators which are intended to be charged with a constant current. Use as an external charger is also, of course, possible.

What is claimed is:

1. A charging circuit for charging an accumulator via a current measuring circuit (G), which produces a measured voltage which is dependent on the charging current and is passed to a voltage comparator (D) which compares the measured circuit (G) with a reference voltage and drives a switching element (E) as a function of the comparison result, which switching element (E) switches the charging current for charging the accumulator on and off, characterized in that the charging circuit draws from its output path, a reference current for producing the reference voltage using a current/voltage converter (B), and comprises a current sink (A) which adjusts the reference current to a specific current level.

2. A charging circuit according to claim 1, characterized in that the current sink (A) is designed such that the reference current is variable.

3. A charging circuit for charging an accumulator via a current measuring circuit (G), which produces a measured voltage which is dependent on the charging current and is passed to a voltage comparator (D) which compares the measured circuit (G) with a reference voltage and drives a switching element (E) as a function of the comparison result, which switching element (E) switches the charging current for charging the accumulator on and off, characterized in that the charging circuit draws from its output path, a reference current for producing the reference voltage using a current/voltage converter (B), and further characterized in that the current measuring circuit (G) comprises one or more parallel-connected impedance elements (27) across which the measured voltage is in each case dropped.

4. Charging circuit according to claim 3, characterized in that the reference voltage which is produced by a current sink is measured upstream of the impedance element or elements (27) and the measured voltage is measured downstream from the impedance element or elements (27).

5. A charging circuit for charging an accumulator via a current measuring circuit (G), which produces a measured voltage which is dependent on the charging current and is passed to a voltage comparator (D) which compares the measured circuit (G) with a reference voltage and drives a switching element (E) as a function of the comparison result, which switching element (E) switches the charging current for charging the accumulator on and off, characterized in that the charging circuit draws from its output path, a reference current for producing the reference voltage using a current/voltage converter (B), and further characterized by a starting circuit (F) for continuously supplying a small current to the output path.

6. A charging circuit according to claim 5, characterized in that the starting circuit (F) is connected to the output path between the switching element (E) and the current measuring circuit (G).

* * * * *